United States Patent [19]

Groves

[11] Patent Number: 5,143,972
[45] Date of Patent: Sep. 1, 1992

[54] PRESSURE-SENSITIVE ADHESIVE COMPOSITION

[75] Inventor: James D. Groves, Hudson, Wis.

[73] Assignee: Minnesota Mining and Manufacturing Company, St. Paul, Minn.

[21] Appl. No.: 525,155

[22] Filed: May 17, 1990

[51] Int. Cl.$^5$ .................. C08L 51/06; C08L 53/02
[52] U.S. Cl. ........................ 525/71; 428/343; 524/323; 524/401
[58] Field of Search ............................ 525/71

[56] References Cited

U.S. PATENT DOCUMENTS

| | | |
|---|---|---|
| 4,209,594 | 6/1980 | Welsh et al. |
| 4,243,500 | 1/1981 | Glennon |
| 4,554,324 | 11/1985 | Husman et al. |
| 4,699,842 | 10/1987 | Jorgensen et al. |
| 4,835,217 | 5/1989 | Jorgensen et al. |

FOREIGN PATENT DOCUMENTS 1-139640   6/1989   Japan.

Primary Examiner—Jacob Zegler
Attorney, Agent, or Firm—Gary L. Griswold; Walter N. Kirn; David L. Weinstein

[57] ABSTRACT

Adhesive composition comprising a blend consisting essentially of (1) an adhesive composition comprising a tacky pressure-sensitive adhesive, said adhesive preferably selected from rubber-based adhesives, e.g., the thermoplastic elastomers, and (2) a pressure-sensitive adhesive composition comprising a polymer having in its backbone at least a major portion by weight of polymerized monomeric acrylic or methacrylic acid ester of a non-tertiary alcohol having from 1 to 14 carbon atoms with the average number of carbon atoms being about 4 to about 12, and grafted to the backbone, polymeric moieties having a Tg greater than about 20° C. and a weight average molecular weight above about 2,000. The pressure-sensitive adhesive of adhesive composition (1) has moieties, e.g., blocks or grafts, that associate with the polymeric moieties grafted to the backbone of the polymer of adhesive composition (2). Pressure-sensitive adhesives prepared from the composition of this invention can be tailored to exhibit high values of peel adhesion with respect to both polar and non-polar surfaces, a high level of tack, and a high level of static shear.

16 Claims, No Drawings

PRESSURE-SENSITIVE ADHESIVE COMPOSITION

BACKGROUND OF THE INVENTION

1. Field of the Invention

This invention relates to pressure-sensitive adhesives, and, more particularly, a composition formed from a blend of pressure-sensitive adhesives.

2. Discussion of the Art

Normally tacky pressure-sensitive adhesive compositions must have an appropriate balance of wetting ability or tack, adhesion, and cohesive strength. All pressure-sensitive adhesive compositions exhibit each of these properties in varying degrees.

Early pressure-sensitive adhesive compositions consisted of natural crude rubber tackified by a mixture of esterified wood rosin. Improved pressure-sensitive adhesive compositions were later realized upon the introduction of synthetic acrylic ester elastomers, which were inherently tacky and possessed improved cohesive and adhesive properties. In addition, they also exhibited low temperature holding power and high resistance to oxidation.

More recently, block copolymers, such as, for example, styrene-isoprene-styrene and styrene-butadiene-styrene, have been formulated into pressure-sensitive adhesive compositions having an excellent balance of tack, adhesion, and cohesive strength. They also exhibit hot melt processability and high values of peel adhesion to both polar and non-polar surfaces. However, they do not exhibit the resistance to oxidation or the high temperature holding power of the acrylic ester elastomer adhesives.

The development of styrene-ethylene/butylene-styrene block copolymers, which have a saturated olefin midblock, permit the formulation of adhesive compositions that exhibit high values of peel adhesion to both polar and non-polar surfaces and are resistant to oxidation and photochemical degradation. Like adhesive compositions that contain styrene-isoprene-styrene and styrene-butadiene-styrene block copolymers, they do not exhibit the high temperature holding power of adhesive compositions that contain acrylic esters. Moreover, they require higher levels of plasticizers or tackifying resins in order to achieve acceptable levels of quick wetting ability (tack). It has also been found that excessive dilution of the block copolymer with tackifiers compromises the cohesive strength of the adhesive.

It has frequently been proposed to blend two or more pressure-sensitive adhesive compositions in order to realize the advantages of each. However, mere blending in solution of two or more different pressure-sensitive adhesives most often results in a composition of poor, or at best, compromised properties, and consequently, the blend is of little or no commercial value as a pressure-sensitive adhesive. There are several reasons for these poor adhesive properties. First, a member from one class of polymers is generally not miscible with a member from another class of polymers. Second, a member from one class of polymers generally adheres poorly to a member from another class of polymers. Accordingly, the interfacial regions between the domains of each component are weak and result in cohesive failure when subjected to stress. Because of this failure, most pairs of polymers are said to be "thermodynamically incompatible". The two major classes of pressure-sensitive adhesives, acrylic adhesives and block copolymer adhesives, are thermodynamically incompatible. However, it would be desirable to combine acrylic adhesives and block copolymer adhesives in order to develop pressure-sensitive adhesive compositions that exhibit the preferred characteristics of each type of adhesive. For example, it would be desirable to develop an adhesive that exhibits the high tack, low temperature adhesion, and high cohesive strength of acrylic adhesives and the high peel adhesion values of block copolymer adhesives without compromising the hot melt processability and resistance to oxidation of both.

SUMMARY OF THE INVENTION

This invention provides a composition suitable for preparing a pressure-sensitive adhesive comprising a blend consisting essentially of:

(1) an adhesive composition comprising a tacky pressure-sensitive adhesive, said adhesive preferably selected from rubber-based adhesives, e.g., the thermoplastic elastomers, and (2) a pressure-sensitive adhesive composition comprising a polymer having in its backbone at least a major portion by weight of polymerized monomeric acrylic or methacrylic acid ester of a non-tertiary alcohol having from 1 to 14 carbon atoms with the average number of carbon atoms being about 4 to about 12, and grafted to the backbone, polymeric moieties having a Tg greater than about 20° C. and a weight average molecular weight above about 2,000, the pressure-sensitive adhesive of adhesive composition (1) having moieties, e.g., blocks or grafts, that associate with the polymeric moieties grafted to the backbone of the polymer of adhesive composition (2).

The number and composition of the attached polymeric moieties in the polymer of composition (2) is such as to provide a tape coated with the adhesive composition with a shear holding value of at least 50 minutes and the adhesive composition with an inherent viscosity greater than 0.2. The ratio, based on weight, of adhesive composition (1) to adhesive composition (2) can range from 99:1 to 1:99, and preferably ranges from 99:1 to 1:1.

Pressure-sensitive adhesives prepared from the composition of this invention can be tailored to exhibit high values of peel adhesion with respect to both polar and non-polar surfaces, a high level of tack, and a high level of static shear.

DETAILED DESCRIPTION

Adhesives suitable for adhesive composition (1) are tacky pressure-sensitive adhesives having moieties, e.g., blocks or grafts, that associate with the polymeric moieties grafted to the backbone of the polymer of adhesive composition (2). As used herein, the term "tacky" means having sticky nature or immediate adhesion on contact with a substrate. Some adhesives are inherently tacky, while others are rendered tacky by addition of a tackifier. The term "tacky" is intended to refer to both inherently tacky adhesives and adhesive compositions which include an added tackifier.

Although any tacky pressure-sensitive adhesive can be used, adhesives derived from rubbers, are preferred for adhesive compositions that are expected to be removable from various substrates. Examples of rubber-based adhesives suitable for adhesive composition (1) include thermoplastic elastomers, such as, for example styrene-butadiene-styrene, styrene-isoprene-styrene, and styrene-ethylene/butylene-styrene. Representative examples of commercially available adhesives suitable for adhesive composition (1) include the styrene-isoprene-styrene elastomer "Kraton 1107" and the styrene-ethylene/butylene-styrene elastomer "Kraton 1657", both available from Shell Chemical Company.

The adhesives of adhesive composition (1) can be tackified by a tackifying agent, by appropriate modification of the structure of the adhesive molecule, or by a combination of both approaches. Tackifiers suitable for tackifying the pressure-sensitive adhesives of adhesive composition (1) include low molecular weight hydrocarbon resins, and α- and β-pinene based resins. Many tackifiers are commercially available, and optimum selection thereof can be accomplished by one of ordinary skill in the adhesive compounding art. Representative examples of commercially available tackifiers suitable for this invention include the resins available under the trademarks "Regalrez 1018", "Regalrex 1078", and "REZ-D 2084", available from Hercules Incorporated, "Escorez-143H", and "Escorez 5380", available from Exxon Corporation, and "Wingtack Plus", available from Firestone Tire and Rubber Co. If rubber is used to prepare adhesive composition (1), the ratio, based on weight, of tackifier to rubber preferably ranges from about 0.5:1.0 to about 2.5:1.0.

Preferably, the pressure-sensitive adhesive composition (2) comprises a copolymer having an inherent viscosity greater than 0.2 and consists essentially of copolymerized repeating units from two types of monomers (hereinafter monomer A and monomer C) and optionally a third type of monomer (hereinafter monomer B). Monomer A is a monomeric acrylic or methacrylic acid ester of a non-tertiary alcohol, said alcohol having from 1 to 14 carbon atoms with the average number of carbon atoms being about 4 to about 12. When used, monomer B is at least one polar monomer copolymerizable with monomer A. Preferred examples of monomer B include acrylic acid, methacrylic acid, itaconic acid, acrylamide, methacrylamide, acrylonitrile and methacrylonitrile. Monomer B can comprise up to 12% by weight of the total weight of all monomers in the copolymer of composition (2). Monomer C has the general formula $X—(Y)_n—Z$ wherein X represents a vinyl group copolymerizable with monomer A and monomer B. Y represents a divalent linking group where n can be zero or one. Z represents a monovalent polymeric moiety having a Tg greater than 20° C. and a weight average molecular weight in the range of about 2,000 to 30,000 and being essentially unreactive under copolymerization conditions. The vinyl group of monomer C and monomer A and monomer B are copolymerized to form a soft backbone having pendant therefrom the aforementioned polymeric moieties. The percent by weight of monomer C is within the range of about 1 to 30% of the total weight of all monomers in the copolymer of composition (2). The total percent by weight of monomer B and monomer C in the copolymer of composition (2) is within the range of about 4 to 30% of the total weight of all monomers in the copolymer.

Monomer A, as previously mentioned, is a monomeric acrylic or methacrylic acid ester of a non-tertiary alcohol, said alcohol having from 1 to 14 carbon atoms with the average number of carbon atoms being about 4 to about 12. Representative examples of monomer A include the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol, and the like. Such monomeric acrylic or methacrylic esters are known in the art and many are commercially available.

As mentioned above, monomer B is copolymerizable with monomer A. Representative examples of monomer B include acrylic acid, methacrylic acid, itaconic acid, acrylamide, methacrylamide, acrylonitrile and methacrylonitrile. Monomer B is not necessary to produce pressure-sensitive adhesive composition (2), but monomer B can be present in a concentration of up to 12% of the total weight of all monomers in the copolymer of composition (2). The preferred pressure-sensitive adhesive composition (2) will contain from 2 to 8% by weight of monomer B based on the total weight of all monomers in the copolymer of composition (2).

Monomer C is a polymeric material having a copolymerizable vinyl group with which monomer A and monomer B will copolymerize under appropriate polymerization conditions. Monomer C can be represented by the general formula $X—(Y)_n—Z$ wherein:

X represents vinyl group copolymerizable with monomer A and monomer B;

Y represents a divalent linking group where n can be zero or one; and

Z represents a monovalent polymeric moiety having a Tg greater than 20° C. and a weight average molecular weight in the range of about 2,000 to 30,000 and being essentially unreactive under copolymerization conditions.

Preferably, monomer C may be further defined as having an X group which has the general formula:

wherein R represents a hydrogen atom or a COOH group and R' represents a hydrogen atom or methyl group. The double bond between the carbon atoms provides a copolymerizable moiety capable of copolymerizing with monomer A and monomer B.

Preferably, monomer C includes a Z group which has the general formula:

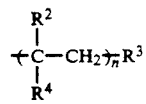

wherein $R^2$ represents a hydrogen atom or a lower alkyl group, $R^3$ represents a lower alkyl group, n represents an integer from 20 to 500 and $R^4$ represents a monovalent radical selected from the group consisting of:

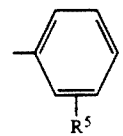

and —$CO_2R^6$ wherein $R^5$ represents a hydrogen atom or a lower alkyl group and $R^6$ represents a lower alkyl group.

Preferably, monomer C has a general formula selected from the group consisting of:

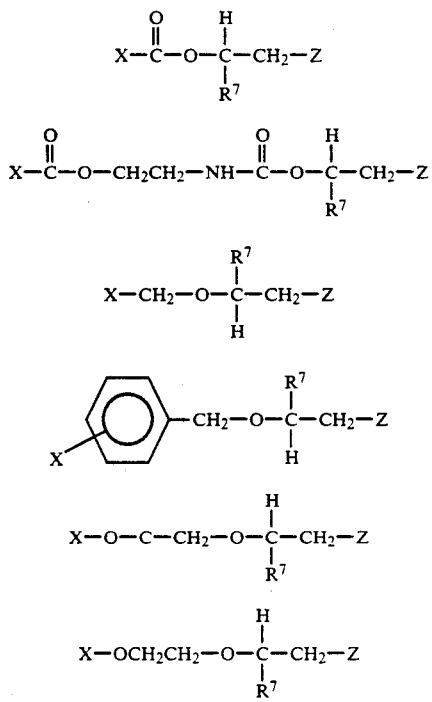

wherein $R^7$ represents a hydrogen atom or a lower alkyl group.

Monomer C is a functionally terminal polymer, having a single functional group (the vinyl group) and is sometimes identified as a "semi-telechelic" polymer. (Vol. 27, "Functionally Terminal Polymers Via Anionic Methods", D. N. Schultz et al, pp. 427–440, *Anionic Polymerization, American Chemical Society* (1981).)

The vinyl-terminated polymeric monomer (monomer C), once polymerized with the acrylate monomer (monomer A) and the polar monomer (monomer B), if used, forms a copolymer having pendant polymeric moieties which tend to reinforce the otherwise soft acrylate backbone, providing a substantial increase in the shear strength of the resultant copolymer adhesive composition (2). The amounts of monomer C set forth above indicate the level at which optimization of the shear strength value is noted. An excessive quantity of monomer C makes the resultant copolymer overly reinforced, decreasing its adhesive tack and making it more like a polymeric film rather than an adhesive composition. While certain of such compositions have utility as hot melt adhesives, they do not generally find utility as pressure-sensitive adhesive compositions.

Adhesive composition (2) is described in greater detail in U.S. Pat. No. 4,554,324, incorporated herein by reference.

The ratio, based on weight, of adhesive composition (1) to adhesive composition (2) in the composition of this invention can range from 99:1 to 1:99, and preferably ranges from 99:1 to 1:1.

Adhesive compositions according to the present invention preferably include an anti-oxidant to inhibit oxidation of the tackifying agent and consequent loss of tackiness as the adhesive composition ages. In this regard, it has been found important to use an anti-oxidant which is based on either (1) a hindered phenol or (2) a sulfur-containing organo-metal salt. Among the hindered phenols are the ortho-substituted or the 2,5-disubstituted phenols where the substituent group (or groups) is a branched hydrocarbon radical having 2 to 30 carbon atoms, e.g., tertiary butyl or tertiary amyl. Other hindered phenols useful in practicing the invention include para-substituted phenols where the substituent groups is —$OR^8$, $R^8$ being methyl, ethyl, 3-substituted propionic ester, etc. Among the sulfur-containing organo-metal salts are the nickel derivatives of dibutyl dithiocarbamate. Representative examples of commercially available anti-oxidants suitable for this invention include the hindered phenols available under the trademarks "Irganox 1076", available from Ciba-Geigy Corp., and "Cyanox LTDP", available from American Cyanamid Co.

Inorganic fillers such as calcium carbonate, clay, talc, silica, and limited amounts of carbon black can be used with the adhesives of this invention, as well as organic fillers such as wood flour or starch. Calcium carbonates, clays and talcs are most commonly used.

Various levels of fillers can be used to significantly reduce costs of formulations containing the adhesives of this invention. Lower levels will scarcely affect properties, whereas higher levels will appreciably increase stiffness, hardness, and resistance to deformation. Very fine particle size fillers, such as bentonite clay or a fumed silica sold under the trade designation "Cab-O-Sil" (Cabot Corporation) can be used to increase viscosity of solutions or to impart thixotropic solution properties.

The adhesives of this invention can be easily colored by compounding with dry pigments or color concentrates (usually polystyrene based). Some typical pigments which may be used are titanium dioxide and carbon black.

The adhesives of this invention require little or no added stabilizers for many applications. Thus, in most formulations, ingredients other than the adhesive composition (1) and adhesive composition (2) will degrade first. Therefore, the kind or type of stabilization required is highly dependent on the formulation rather than on the nature of adhesive composition (1) or adhesive composition (2).

Various stabilizer systems, as well as fungicides and mildewcides, are entirely compatible with the adhesives of this invention.

The resistance to ultraviolet light degradation of the adhesives of this invention can be enhanced by incorporating ultraviolet inhibitors into the adhesive composition of the invention. Typically a 1 phr loading of the ultraviolet inhibitor having the trade designation "Cyasorb IV 531" (American Cyanamid Co.), or a mixture of equal parts of ultraviolet inhibitors having the trade designations "Tinuvin 328" (Ciba-Geigy Corp.) and "Uvinul 400" (GAF Corp.) is sufficient to provide this enhancement. Enhanced results may be achieved from a combination of 0.5 phr of one of the three above-mentioned ultraviolet inhibitors with a nickel chelate having one of the following trade designations: "Cyasorb UV 1084" (0.5 phr)(American Cyanamid Co.) or "NBC" (0.1 phr)(E.I. du Pont de Nemours and Company). As used herein, phr is based on the weight of rubber in adhesive composition (1).

The adhesive composition of this invention can be used in the following areas: mounting and masking tapes, particularly when the tape is to be removed after long-term exposure to oxidation; tape for adhering to non-polar surfaces and to polar surfaces, e.g., window insulating kits, automobile side moldings.

The adhesive composition can be applied to a backing material by conventional means, such as, for example, knife coating, blade coating, roll coating, extrusion coating, hot melt coating, to form a tape. Backing materials can be flexible or inflexible. Flexible backing materials can be any material conventionally utilized as a tape backing or any other flexible material. Typical examples of flexible backing materials employed as conventional tape backings which can be used as tape backings for the adhesive compositions of this invention include those made of paper and those made of plastic films, such as, for example, polypropylene, polyethylene, polyvinyl chloride, polyester (e.g., polyethylene terephthalate), cellulose acetate, and ethyl cellulose.

Backings can also be prepared of fabric such as woven fabric formed of threads of synthetic or natural materials such as cotton, nylon, rayon, glass, ceramic material, and the like, or non-woven fabric such as air laid webs of natural or synthetic fibers or blends of these. The backing can also be formed of metal, metallized polymeric films, or ceramic sheet materials. The coated sheet materials can take the form of any article conventionally known to be utilized with pressure-sensitive adhesive compositions such as labels, tapes, signs, covers, marking indicia, and the like.

The adhesive composition of this invention can also be used as a transfer adhesive.

The adhesive composition of this invention provides unexpected advantages over the adhesive compositions of U.S. Pat. Nos. 554,324 and 4,835,217. One significant advantage is that no surfactants are required to blend the two adhesive compositions. Deletion of surfactants not only greatly simplifies manufacturing operations, but also decreases moisture sensitivity. Another significant advantage is that the adhesive blend can be used with both high energy surfaces and low energy surfaces, thereby allowing bonding between polyolefins and wood, metal, glass, and polymeric surfaces.

TEST METHODS

The test methods used to evaluate the parameters of flexible sheet materials coated with the pressure-sensitive adhesive composition of this invention are standard industrial tests. The standard tests are described in detail in various publications of the American Society for Testing and Materials (ASTM), Philadelphia, Pa. and the Pressure-Sensitive Tape Council (PSTC), Glenview, Ill. The standard test methods are described in detail below. The reference source of each of the standard test methods is also given.

SHEAR STRENGTH

Reference: ASTM: D3654-78; PSTC-7

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load.

The tests were conducted on adhesive coated strips applied to a stainless steel panel such that a 12.5 mm by 12.5 mm portion of each strip was in firm contact with the panel with one end portion of the tape being free. The panel with coated strip attached was held in a rack such that the panel forms an angle of 178° with the extended tape-free end which is then tensioned by application of a force of one kilogram applied as a hanging weight from the free end of the coated strip. The 2° less than 180° is used to negate any peel forces, thereby insuring that only the shear forces are measured in an attempt to more accurately determine the holding power of the tape being tested. The time elapsed for each tape example to separate from the test panel is recorded as the shear strength.

PEEL ADHESION

Reference: ASTM: D3330-78; PSTC-1 (11/75)

Peel adhesion is the force required to remove a coated flexible sheet material from a test panel measured at a specific angle and rate of removal. In the examples, this force is expressed in Newtons per 100 mm (N/100 mm) width of coated sheet. The measurement procedure is as follows:

1. A 12.5 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself so the angle of removal will be 180°. The free end is attached to the adhesion tester scale.
3. The glass test plate is clamped in the jaws of a tensile testing machine which is capable of moving the plate away from the scale at a constant rate of 2.3 meters per minute.
4. The scale reading in Newtons is recorded as the tape is peeled from the glass surface. The data is reported as the range of numbers observed during the test.

ADHESIVE ANCHORAGE TO BACKING

Adhesive anchorage to backing is measured by the following procedure:

1. The adhesive-bearing surface of a 1.25 cm by 20 cm strip of pressure-sensitive adhesive tape (3M Brand Electrical Tape No. 56) is laminated to a 1.25 cm by 15 cm strip of polyethylene terephthalate bearing a layer of the adhesive composition of the sample. The strips are laminated such that the adhesive layer of one is in contact with the adhesive layer of the other.
2. The two laminated strips are then separated at 180° at a rate of 2.3 meters per minute in accordance with PSTC-1 (11/75).

INHERENT VISCOSITY MEASUREMENT

The inherent viscosity is measured by conventional means using a Cannon-Fenske #50 viscometer in a water bath controlled at 25° C. to measure the flow time of 10 ml of a polymer solution (0.15 g of polymer per deciliter of ethyl acetate). The examples and control examples being run for comparison were run under identical conditions.

The following, non-limiting examples further illustrate the present invention. All percentages are in percentage by weight unless indicated otherwise.

EXAMPLE 1

This example illustrates a composition for preparing the pressure-sensitive adhesive of the present invention.

Preparation of Adhesive Composition (1)

The following ingredients in the amounts indicated were introduced into a one-liter jar.

| Ingredient | Amount (g) |
| --- | --- |
| Styrene-ethylene/butylene-styrene elastomer ("Kraton 1657", Shell Chemical Company) | 100 |
| Tackifier ("Regalrez 1018", Hercules Incorporated) | 75 |
| Tackifier ("REZ-D 2084", Hercules Incorporated) | 125 |
| Anti-oxidant ("Irganox 1076", Ciba-Geigy Corp.) | 1 |
| Anti-oxidant ("Cyanox LTDP", American Cyanamid Co.) | 1 |
| Ultraviolet inhibitor ("Tinuvin 328", Ciba-Geigy Corp.) | 0.3 |
| Ultraviolet inhibitor ("Uvinul 400", GAF Corp.) | 0.3 |
| Toluene | 370 |

The jar was shaken until the materials dissolved to give a solution containing 45% solids and having a viscosity of 1360 cps (as measured by a Brookfield viscometer, Model HAT, Spindle No. 4, speed at 50 rpm).

Preparation of Adhesive Composition (2)

The following ingredients, in the amounts indicated, were introduced into a 475 ml narrow-mouth jar.

| Ingredient | Amount (g) |
| --- | --- |
| Isooctylacrylate | 88 |
| Acrylamide | 2.5 |
| Acrylic acid | 2.5 |
| 2-Polystyrylethyl methacrylate (weight average molecular weight of about 10,000 g/mol, prepared according to U.S. Pat. No. 4,554,324; 52% solids in cyclohexane) | 13.5 |
| Ethyl acetate | 76.5 |
| Methyl ethyl ketone | 17 |
| Toluene | 50 |

The bottle wads purged with dry argon for three minutes, then capped, and finally placed in a water bath held at a temperature of 55° C. for 22 hours. The percentage of conversion was determined to be 98.7% by infrared spectrophotometric analysis. The solution contained 40% solids and had a viscosity of about 3500 cps (as measured by a Brookfield viscometer, Model HAT, Spindle No. 4, speed at 50 rpm). The inherent viscosity was 0.53 determined using 0.15 g of polymer in 100 ml of ethyl acetate.

Preparation of Blend of Adhesive Composition (1) and Adhesive Composition (2)

Into a 118 ml jar was introduced 33.3 g of adhesive composition (1) and 12.5 g of adhesive compositions (2). The mixture was stirred vigorously until it was homogeneous. The jar was then capped, and it and the contents thereof were then heated at 65° C. for about an hour. Then the mixture was stirred vigorously and allowed to stand overnight. After standing, the mixture separated into two phases. The phases were easily redispersed by mild agitation to give a cloudy, homogeneous coating solution. The adhesive contained 75% by weight adhesive composition (1) and 25% by weight adhesive composition (2).

EXAMPLES 2-4 AND CONTROL EXAMPLES 1 AND 2

In like manner, but by varying the amounts of adhesive composition (1) and adhesive composition (2), adhesive compositions containing 65% by weight adhesive composition (1) and 35% by weight adhesive composition (2), 50% by weight adhesive composition (1) and 50% by weight adhesive composition (2), 25% by weight adhesive composition (1) and 75% by weight adhesive composition (2) were prepared. The ingredients and amounts of the foregoing adhesive compositions (1) and (2) along with a first control example containing 100% by weight adhesive composition (1) and a second control example containing 100% by weight adhesive composition (2) are set forth in Table I.

TABLE I

| Example no. | Amount (% by weight) | |
| --- | --- | --- |
| | Adhesive composition (1) | Adhesive composition (2) |
| Control 1 | 100 | 0 |
| 1 | 75 | 25 |
| 2 | 65 | 35 |
| 3 | 50 | 50 |
| 4 | 25 | 75 |
| Control 2 | 0 | 100 |

Viscosities of the solutions of the adhesive blends of Examples 1-4 ranged from 3,000 to 4,000 cps (as measured by Brookfield viscometer, Model HAT, Spindle No. 4, speed at 50 rpm). The blend of each example and the adhesive compositions of Control Example 1 and Control Example 2 were coated onto oriented polyethylene terephthalate film having 0.025 mm thickness by means of laboratory 6-inch knife coater at a knife setting of about 0.18 mm. The coated films were dried in an air-circulating oven at 95° C. for 15 minutes to give an average adhesive coating weight of about 4.2 mg/cm$^2$.

Each coated film was then tested for peel adhesion, adhesive anchorage to the polyethylene terephthalate backing, shear, and tack. Peel adhesion data is set forth in Table II. Anchorage, shear, and tack data are set forth in Table III.

COMPARATIVE EXAMPLE 1

The procedure of Example 2 was repeated with the exception that 2-polystyrylethyl methacrylate was omitted from adhesive composition (2) and that the percentage of solids in adhesive composition (2) was decreased from 40% to 35%. The percentage of conversion of the adhesive composition (2) that lacked the 2-polystyrylethyl methacrylate was determined to be 99.2%. The blend had a viscosity of about 2,000 cps (as measured by a Brookfield viscometer, Model HAT, Spindle No. 4, speed at 50 rpm). The inherent viscosity was determined to be 0.57. The blend, which contained 65% by weight adhesive composition (1) and 35% by weight adhesive composition (2) but with no 2-polystyrylethyl methacrylate, was coated and tested in the same manner as was the blend of Example 2. The results are set forth in the last lines of Tables II and III.

TABLE II

| Example | Peel adhesion (N/100 mm) | | | | |
|---|---|---|---|---|---|
| | Glass | Aluminum | Low density polyethylene* | Polypropylene* | Stainless steel |
| Control 1 | 92.6 | 83.0 | 38.2 | 79.1 | 74.0 |
| 1 | 64.8 | 56.3 | 22.8 | 57.4 | 47.3 |
| 2 | 55.2 | 55.2 | 18.6 | 52.5 | 52.1 |
| 3 | 54.8 | 46.0 | 12.3 | 43.4 | 47.3 |
| 4 | 46.0 | 32.8 | 3.7 | 26.3 | 31.3 |
| Control 2 | 36.3 | 48.2 | 1.8 | 14.2 | 32.4 |
| Comparative 1 | 74.5 | 56.7 | 22.5 | 54.3 | 62.4 |

*Test specimens had the dimensions 51 mm × 127 mm × 4.8 mm (Precision Punch and Plastics, Minneapolis, Minnesota)

TABLE III

| Example | Anchorage (N/100 mm) | Shear (min) | Tack |
|---|---|---|---|
| Control 1 | 141.7 | 382 | Poor |
| 1 | 117.4 | 5000+ | Good |
| 2 | 104.0 | 5000+ | Very Good |
| 3 | 95.9 | 5000+ | Excellent |
| 4 | 78.3 | 5000+ | Excellent |
| Control 2 | 75.3 | 5000+ | Excellent |
| Comparative 1 | 102.9 | 22 | Very Good |

From the data in Tables II and III, the unexpected advantages of the adhesives of this invention are apparent. By adjusting the ratio of adhesive composition (1) to adhesive composition (2), pressure-sensitive adhesives can be prepared that possess an excellent balance of tack, adhesion to both polar and non-polar surfaces, adhesive anchorage to backing and shear. The degree of these properties is unattainable with the adhesives of either of the Control Example 1 or Control Example 2.

In Comparative Example 1, the absence of 2-polystyrylethyl methacrylate from adhesive composition (2) results in the attainment of a very low value of static shear.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composition comprising a blend consisting essentially of:
    (1) an adhesive composition comprising a tacky pressure-sensitive adhesive; and
    (2) a normally tacky and pressure-sensitive adhesive composition comprising a polymer having in its backbone at least a major portion by weight of polymerized monomeric acrylic or methacrylic acid ester of a non-tertiary alcohol having from 1 to 14 carbon atoms with the average number of carbon atoms being about 4 to about 12, and grafted to the backbone, polymeric moieties having a Tg greater than 20° C. and a weight average molecular weight above 2,000,
said adhesive of adhesive composition (1) having moieties that associate with the polymeric moieties grafted to the backbone of the polymer of adhesive composition (2).

2. The composition of claim 1, wherein said tacky, pressure-sensitive adhesive of adhesive composition (1) is a rubber-based adhesive.

3. The composition of claim 2, wherein the adhesive of said adhesive composition (1) comprises a thermoplastic elastomer.

4. The composition of claim 3, wherein said thermoplastic elastomer is a block copolymer selected from the group consisting of styrene-butadiene-styrene, styrene-isoprene-styrene, and styrene-ethylene/butylene-styrene.

5. The composition of claim 1, wherein adhesive composition (2) comprises a copolymer having an inherent viscosity greater than 0.2 and consists essentially of copolymerized repeating units from (a) a monomeric acrylic or methacrylic acid ester of a non-tertiary alcohol, said alcohol having from 1 to 14 carbon atoms with the average number of carbon atoms being about 4 to about 12, and (b) a monomer having the general formula $X-(Y)_n-Z$ wherein X represents a vinyl group copolymerizable with said monomeric ester, Y represents a divalent linking group where n can be zero or one, Z represents a monovalent polymeric moiety having a Tg greater than 20° C. and a weight average molecular weight in the range of above 2,000 to 30,000 and being essentially unreactive under copolymerization conditions.

6. The composition of claim 5, wherein the X group of said monomer having the general formula $X-(Y)_n-Z$, has the general formula:

wherein R represents a hydrogen atom or a COOH group and R' represents a hydrogen atom or methyl group.

7. The composition of claim 5, wherein the Z group of said monomer having the general formula $X-(Y)_n-Z$, has the general formula:

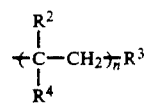

wherein $R^2$ represents a hydrogen atom or a lower alkyl group, $R^3$ represents a lower alkyl group, n represents an integer from 20 to 500, and $R^4$ represents a monovalent radical selected from the group consisting of:

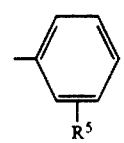

and $-CO_2R^6$ wherein $R^5$ represents a hydrogen atom or a lower alkyl group and $R^6$ represents a lower alkyl group.

8. The composition of claim 5, wherein said monomer having the general formula $X-(Y)_n-Z$, is selected from the group consisting of:

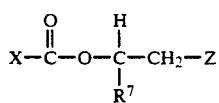

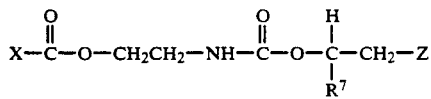

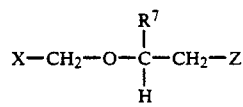

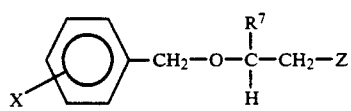

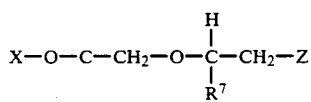

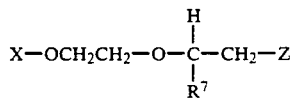

wherein $R^7$ represents a hydrogen atom or a lower alkyl group.

9. The composition of claim 5, wherein the weight of said monomer having the general formula $X-(Y)_n-Z$ ranges from about 1 to 30%, based on weight of the total weight of all monomers in said polymer of composition (2).

10. The composition of claim 5, further including at least one polar monomer copolymerizable with said monomeric ester and with said group represented by X.

11. The composition of claim 10, wherein said polar monomer is selected from the group consisting of acrylic acid, methacrylic acid, itaconic acid, acrylamide, methacrylamide, acrylonitrile, and methacrylonitrile.

12. The composition of claim 10, wherein the amount by weight of said polar monomer can be up to 12% of the total weight of all monomers in said polymer of composition (2).

13. The composition of claim 10, wherein the total weight of said polar monomer and said monomer having the general formula $X-(Y)_n-Z$ ranges from about 4 to 30% of the total weight of all monomers in said polymer of composition (2).

14. The composition of claim 1, wherein the number and composition of the attached polymeric moieties in the polymer of composition (2) is such as to provide a tape coated with the adhesive composition with a shear holding value of at least 50 minutes and the adhesive composition with an inherent viscosity greater than 0.2.

15. The composition of claim 1, wherein the ratio, based on weight, of adhesive composition (1) to adhesive composition (2) ranges from 99:1 to 1:99.

16. The composition of claim 1, wherein the ratio, based on weight, of adhesive composition (1) to adhesive composition (2) ranges from 99:1 to 1:1.

* * * * *